United States Patent
Koskela et al.

(10) Patent No.: US 11,223,403 B2
(45) Date of Patent: Jan. 11, 2022

(54) MOBILITY MEASUREMENTS

(71) Applicant: Nokia Technologies Oy, Espoo (FI)

(72) Inventors: Timo Koskela, Oulu (FI); Samuli Turtinen, Ii (FI); Juho Mikko Oskari Pirskanen, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 36 days.

(21) Appl. No.: 15/586,227

(22) Filed: May 3, 2017

(65) Prior Publication Data

US 2017/0324459 A1 Nov. 9, 2017

Related U.S. Application Data

(60) Provisional application No. 62/332,229, filed on May 5, 2016.

(51) Int. Cl.
| | |
|---|---|
| *H04B 7/06* | (2006.01) |
| *H04W 36/00* | (2009.01) |
| *H04W 24/08* | (2009.01) |

(52) U.S. Cl.
CPC .......... *H04B 7/0617* (2013.01); *H04W 24/08* (2013.01); *H04W 36/0085* (2018.08)

(58) Field of Classification Search
CPC ... H04B 7/0408; H04B 7/0617; H04W 16/28; H04W 24/08; H04W 24/10; H04W 36/0083; H04W 48/16
USPC ........................ 370/252, 254, 329; 455/575.7
See application file for complete search history.

(56) References Cited

U.S. PATENT DOCUMENTS

| | | |
|---|---|---|
| 6,438,389 B1 | 8/2002 | Sandhu et al. |
| 2005/0202859 A1* | 9/2005 | Johnson ............... H04B 7/0408 455/575.7 |
| 2015/0049824 A1 | 2/2015 | Kim et al. |
| 2015/0222345 A1 | 8/2015 | Chapman et al. |
| 2017/0208494 A1* | 7/2017 | Moon ................... H04W 24/10 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 13)", 3GPP TS 36.300, V13.3.0, Mar. 2016, pp. 1-295.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, pp. 1-551.
European Office Action corresponding to European Application No. 17 169 373.2, dated Jun. 21, 2019.

* cited by examiner

*Primary Examiner* — Harun Chowdhury
(74) *Attorney, Agent, or Firm* — Squire Patton Boggs (US) LLP

(57) ABSTRACT

Determination of characteristics of a communication environment may be beneficial in many communication systems. For example, certain wireless communication systems, such as fifth generation (5G) communication systems, may benefit from appropriate mobility measurements. A method can include performing, at a user equipment, beam-specific measurements of a plurality of beams of at least one cell. The method can also include calculating a cell quality based on the beam-specific measurements.

19 Claims, 8 Drawing Sheets

MOBILITY MEASUREMENTS

BACKGROUND

Field

Determination of characteristics of a communication environment may be beneficial in many communication systems. For example, certain wireless communication systems, such as fifth generation (5G) communication systems, long term evolution advanced (LTE-A), and wireless local area network (WLAN) may benefit from appropriate mobility measurements.

Description of the Related Art 5G radio access systems may include a variety of different transceiver architectures: digital, analog, or hybrid baseband processing. Hybrid baseband processing can use a hybrid of digital baseband processing, such as Multiple Input Multiple Output (MIMO) and/or digital precoding. Although some aspects of certain embodiments of the present invention may be discussed in the context of analog beamforming, namely a fully analog or hybrid transceiver, the same principles may be similarly applied to digital beamforming transceiver architectures, and to any other beamforming architectures.

Beamforming can be used for many purposes. For example, beamforming can be used to compensate for increased path loss when operating on higher frequencies while providing cell coverage. Transceiver architectures can implement beamforming. The choice of transceiver architecture may depend on cost and complexity limitations. As an example, systems deployed to lower frequencies, such as below 6 GHz, may be implemented by using a fully digital architecture. It should be appreciated that the indicated cut-off frequency is merely artificial and provided as an example. By contrast, in systems with higher frequencies the number of antenna elements required for cell coverage may range from tens to hundreds (to provide sufficient antenna array gain) and may be implemented using a hybrid-architecture, or even a fully analog architecture. Additionally as a single beam may cover only a part of a coverage area or coverage volume, multiple beams may be sequentially applied to cover the area or volume.

FIG. 1 illustrates a sweeping sub-frame. In 5G, a sweeping sub-frame may provide coverage for common control channel signaling with beamforming. A sweeping sub-frame can include sweeping blocks (SB). A single block can cover a specific area or volume of the cell with a set of active beams.

Thus, a sweeping sub-frame is illustrated in FIG. 1. The total number of beams required to cover a required cell area may be much larger than the number of concurrent active beams the access point is able to form. Therefore the access points may sweep through the cell coverage area in the time domain by activating a different set of beams on each SB. Depending on the number of active beams per sweep block and the total number of beams required to cover a cell area (which may range from tens to hundreds to cover all the directions in azimuth and elevation), multiple sweep blocks may be needed. Also, the number of sweep blocks per sub-frame may be limited by the length of each sweep. As an example, one SB duration may be one or two symbols of orthogonal frequency division multiplexing (OFDM). Thus, if there are 14 symbols per sub-frame, the sweeping sub-frame may be able to accommodate 7 SBs (if 2 symbols are used). Depending on the number of SBs required to cover a cell, multiple sweeping sub-frames may be needed.

The active beam depicted in the FIG. 1 may be used for either transmitting or receiving information. Thus the sweeping sub-frame may be a downlink sweeping sub-frame or an uplink sub-frame. Further, assuming a time division duplex (TDD) system and reciprocity between downlink and uplink channels, essentially the same SBs need to be defined on uplink and downlink direction to cover cell area on uplink and downlink direction with same beam configurations per sweeping block.

As an example, if downlink common control channel coverage is provided by the sweeping sub-frame, each SBs can carry essential cell access information such as downlink (DL) synchronization signals, system information such as master information block (MIB), system information block (SIB) or the like (including PRACH/RACH configurations), also paging (or any control information that needs to be broadcasted in a cell). In the uplink direction the sweeping sub-frame/sub-frames may accommodate resources for random access channel or other uplink channels requiring periodic availability such as scheduling request (SR) or sounding reference signal (SRS).

In a beam-formed system in which cell coverage is provided by multiple beams, it may be beneficial to identify a single beam. Such identification may be performed, for example, by using beam specific reference signals, which enable a user equipment (UE) to perform beam level detection/separation. The UE may also detect multiple beams: the radiation patterns of different beams typically overlap to provide solid coverage throughout the cell. Also the beam radiation patterns may have a high level of directivity in the direction of the main lobe but may also radiate meaningful amounts of energy to other directions as well (typically these are called side lobes and back lobe). Detection or separation of beams may be beneficial in some cases, such as when a UE indicates to the network the preferred communication beam or beams during initial access or refers to a specific beam or set of beams when reporting measurements.

A single beam in a sweep block can be identified, for example, by using beam specific reference signals enabling a user equipment (UE) to perform beam level detection/separation. These reference signals can be associated to beams and an identifier can be given to a specific beam separated by the reference signal. The beam specific reference symbols can be reused in the next SB but the SB identifier can be used to separate beams of different SB s. The SB identifier may be explicitly signaled in each SB or calculated by using time domain mapping to a known time reference, or otherwise provided. Thus, one way to calculate a beam identifier may be simply to calculate Beam_RS_ID*Sweep_Block_ID. If only one beam is active per sweep block the sweep block identifier can also identify the beam. This situation in which only one beam is active per sweep block may arise when, for example, an access point is able to form only one beam or alternatively sends only one reference signal using multiple beam patterns.

Also the beam may have a few alternative definitions. One way to express a beam is to identify a beam based on beam specific reference signal. Thus different beams can be separated by detecting different beam specific reference signals. These reference signals can be measured so that a quality value such as reference signal received power (RSRP) or reference signal received quality (RSRQ) can be determined. Alternatively or additionally measurements can also be made from channel state information-reference signals (CSI-RS), demodulation reference signals (DM-RS) for data or for control, or the like. Some of these different reference signals may be periodically transmitted, such signals may be present only when data or control is transmitted, or such signals may be transmitted when scheduled or triggered as per UE request.

Alternatively, one beam may be defined as a so-called polarization pair so that a beam specific reference signal (BRS) is transmitted simultaneously by using two beams pointing in the same direction. For example, radiation patterns can overlap as the beams may have equal weighting for antenna elements. The antenna elements of the first beam can provide vertical polarization for the signal and the elements of the second beam can provide horizontal polarization. Thus, in this case the receiver may see only one BRS signal.

If specific BRS is transmitted using multiple beams, the UE may see the multiple beams as one beam, as the UE only detects one BRS over the beams. Thus a detection of a BRS can define a beam. This applies for both analog and digital beamforming.

Furthermore, BRS signals may be derived by using a cell identifier thus different BRS signals from different cells can be separated and measured by a receiver and linked to a said cell specific identifier.

FIG. 2 illustrates measurement reporting. FIG. 2 is based on 3GPP technical specification (TS) 36.300, Overall description; Stage 2: Chapter 10.6 Measurement Model. As shown in FIG. 2, at A there can be measurements or samples internal to the physical layer. Layer 1 filtering can be applied to the inputs measured at point A. This layer 1 filtering can be, for example, taking an average of several measured reference symbols.

At B there can be a measurement reported by layer 1 to layer 3 after layer 1 filtering. Then, there can be layer 3 filtering performed on the measurements provided at point B. The behavior of the Layer 3 filters can be standardized and the configuration of the layer 3 filters can be provided by radio resource control (RRC) signaling Filtering reporting period at C can equal one measurement period at B.

At C there can be a measurement after processing in the layer 3 filter. The reporting rate can be identical to the reporting rate at point B. This measurement can be used as input for one or more evaluation(s) of reporting criteria.

Evaluation of reporting criteria can check whether actual measurement reporting is necessary at point D. Then, if so, at D a measurement report information message can be sent on the radio interface.

3GPP TS 36.331 RRC Specification 5.5.4 Measurement report triggering, describes how measurement reporting can be triggered. As described there, LTE measurement report trigger events can include the following: A1 Serving becomes better than threshold; A2 Serving becomes worse than threshold; A3 Neighbor becomes offset better than primary cell (PCell); A4 Neighbor becomes better than threshold; A5 PCell becomes worse than threshold1 and neighbor becomes better than threshold2; A6 Neighbor becomes offset better than secondary cell (SCell); C1 channel state information reference signals (CSI-RS) resource becomes better than threshold; C2 CSI-RS resource becomes offset better than reference CSI-RS resource; B1 Inter radio access technology (RAT) neighbor becomes better than threshold; and B2 PCell becomes worse than threshold1 and inter RAT neighbor becomes better than threshold2.

BRIEF DESCRIPTION OF THE DRAWINGS

For proper understanding of the invention, reference should be made to the accompanying drawings, wherein.

DETAILED DESCRIPTION

Certain embodiments address an issue of determining cell quality for evaluating reporting criteria in a system utilizing, for example, analog and hybrid beamforming. UE may detect one or multiple beams per cell at one time instance and, for example, the received power levels per beam may vary fast over a short period of time. In current cellular systems, such as GERAN, UTRAN, and E-UTRAN, the UE filters different measurement samples from single cell based on reference/pilot symbols. The reference/pilot symbols are sent to the complete cell coverage in those systems. Therefore, current filtering mechanisms involve all samples from a cell being averaged together can compared to cell-based criteria to determine when to trigger measurement reports. By contrast, certain embodiments may address a situation in which beam-specific measurement reporting may be desired, and when averaging across an entire cell may not be desired even for cell-based reporting.

Further, certain embodiments address reporting criteria evaluation for intra cell mobility, such as beam level mobility in a cell. For example, a UE may move out of the coverage area of, or be obstructed from, a beam but may also detect one or more other beams during the measurement period.

Figure 1:
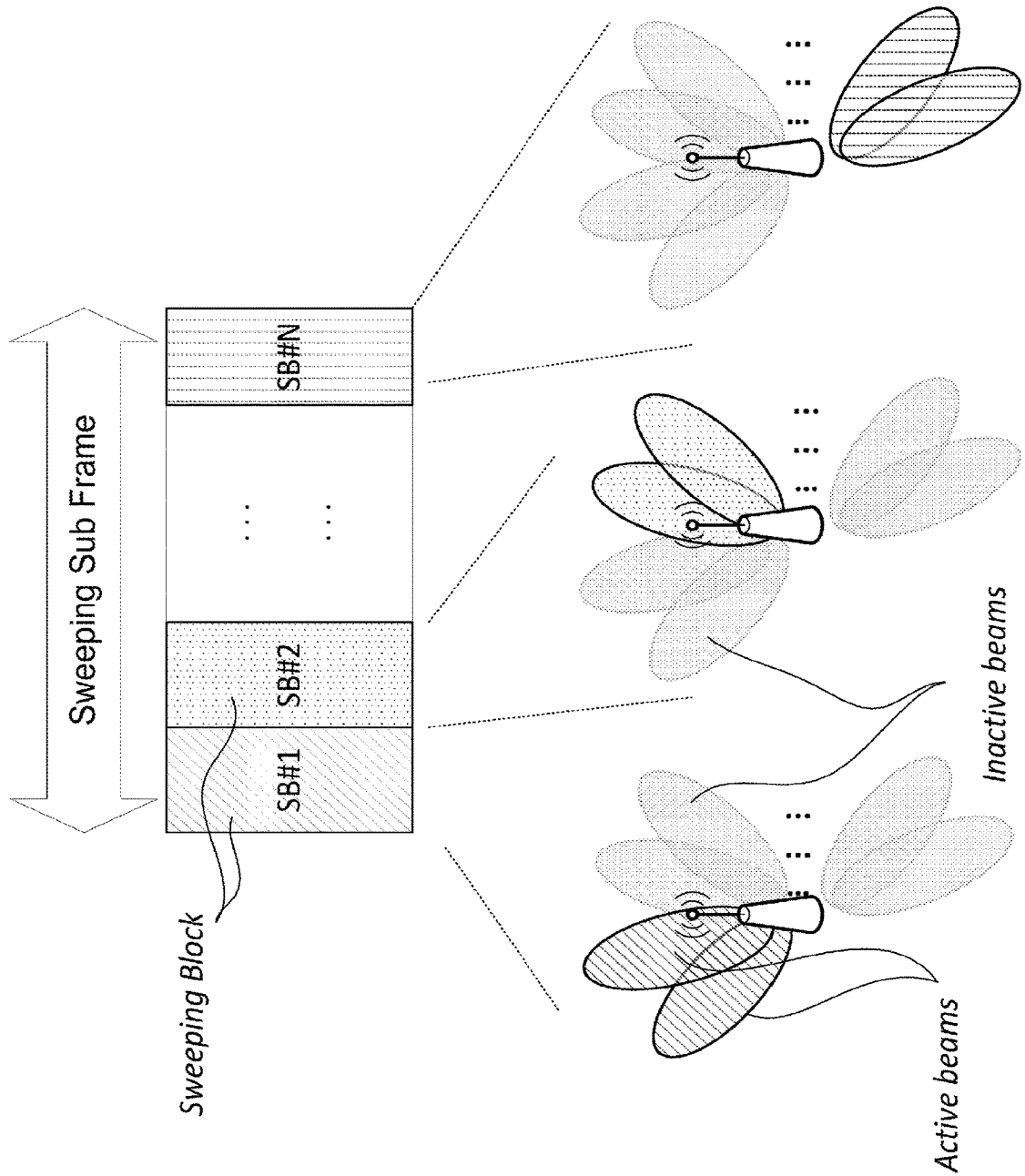
FIG. 1 illustrates a sweeping sub-frame.
Figure 2:
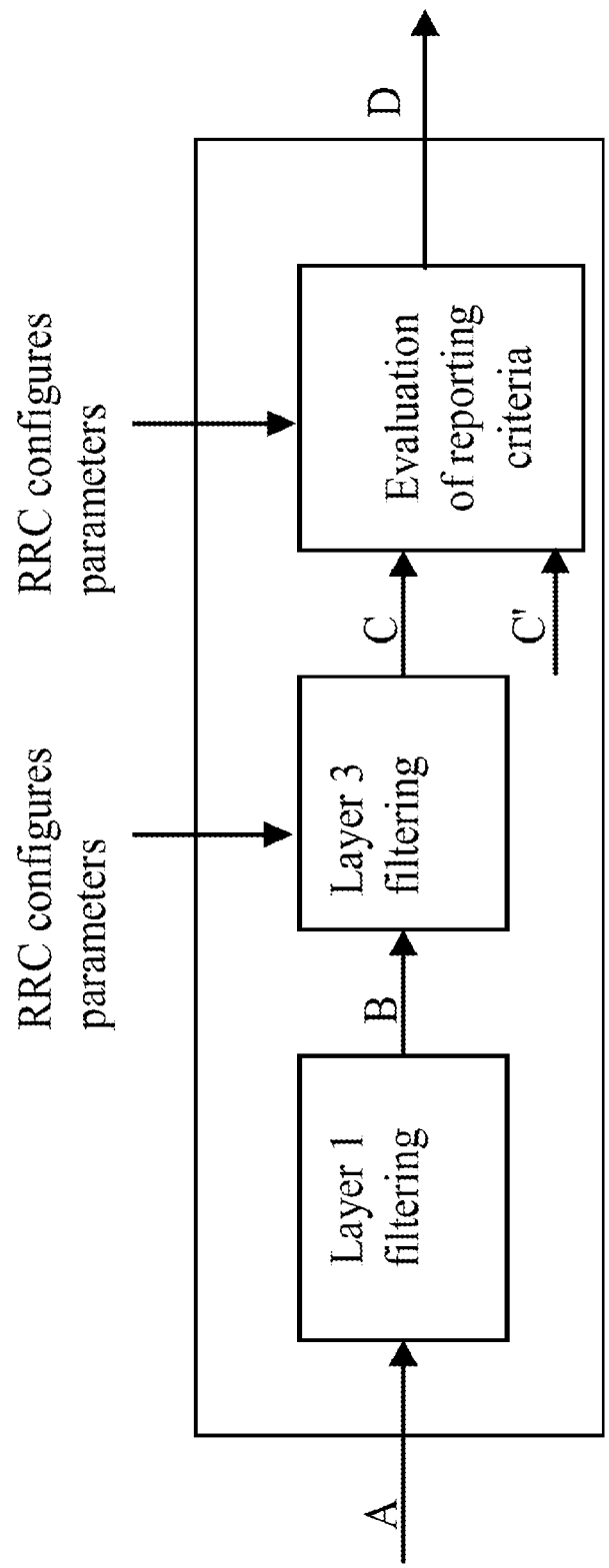
FIG. 2 illustrates measurement reporting.
Figure 3:
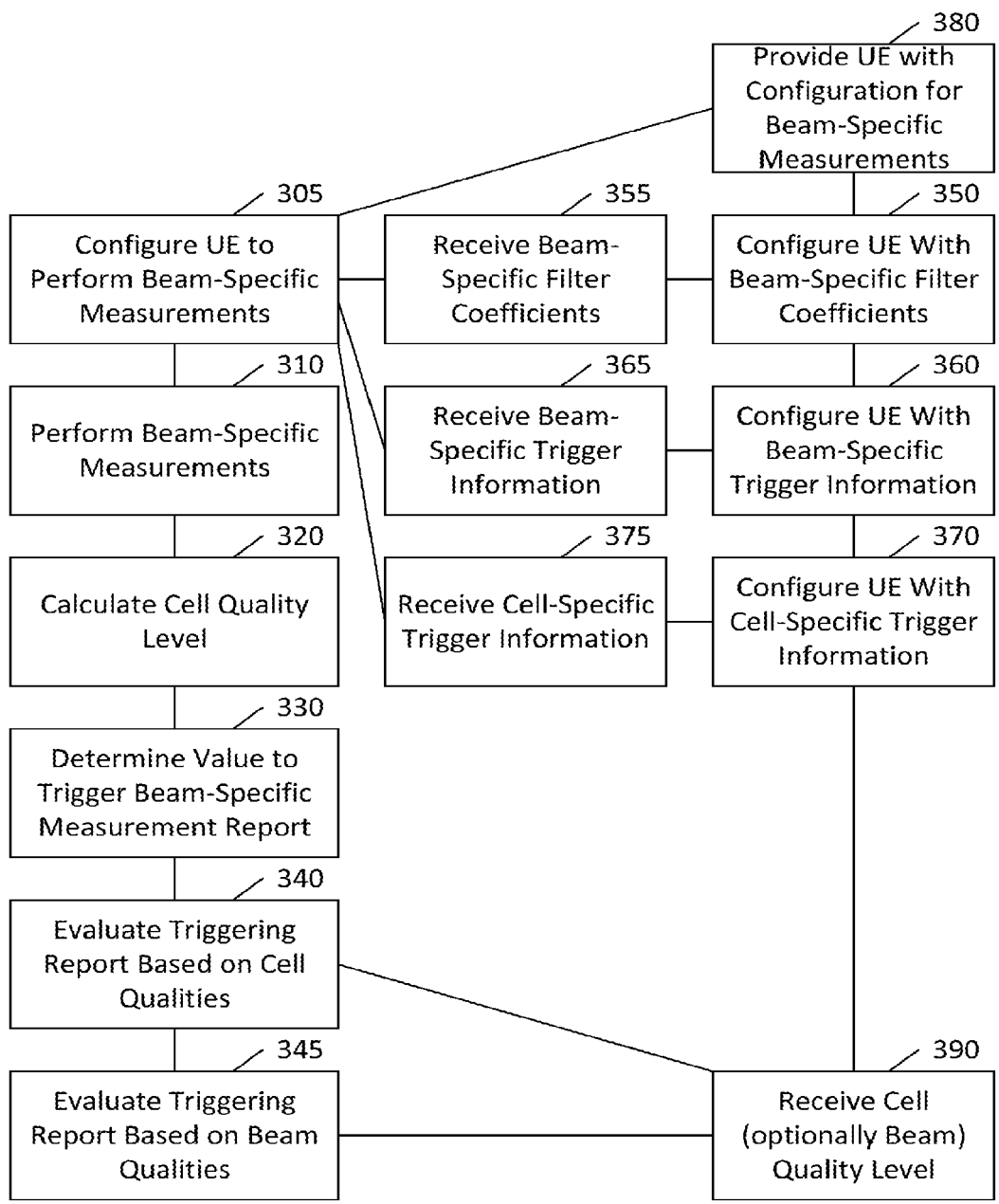
FIG. 3 illustrates a method according to certain embodiments.

FIG. 3 illustrates a method according to certain embodiments. As shown in FIG. 3, a method can include, at 310 performing beam-specific measurements of a plurality of beams of cell. The method can also include, at 320, calculating a cell quality level based on the beam-specific measurements. The method can additionally, at 305, include configuring a UE to perform the beam-specific measurements.

This configuring of the UE can be done with respect to a beam-formed system. Moreover, the configuration can configure the UE to perform beam specific L1 measurements (and may apply also L1 filtering such as linear average of measurements performed on reference signals/symbols over the measured frequency band) and higher layer filtering (L2/L3) of physical layer measurements of the beam specific samples, and to calculate a cell quality level based on the filtered beam specific samples. Thus, in certain embodiments a cell quality level may take into account beam specific samples, rather than treating the cell as a single beam. Such higher layer filtering may be, but not limited to, so-called 'moving average' filtering where previous filtered measurement result is weighted with weight_1 and the latest received measurement result is weighted with weight_2. There may be interdependency between the weights. For example, weight_1=alpha and weight_2=1−alpha is one possible interdependent weighting scheme.

The method can also include, at 330, determining a value to trigger a measurement report with a beam-specific measurement. This determination may include, for example, determining criteria values to trigger a specific measurement report with beam specific measurements.

The method can further include, at 340, evaluating whether to trigger a measurement report based on cell qualities, and at 345, evaluating whether to trigger a measurement report based on beam qualities. Thus, for each measurement period, there can be a separate evaluation of the criteria for triggering a measurement report based on the calculated cell qualities and serving cell(s) beam qualities.

The method can additionally include, performing a first level of higher layer filtering of beam specific samples and evaluating measurement report trigger at L2 (e.g. MAC layer, triggering MAC level measurement report based on beam qualities), performing a second level of higher layer filtering and evaluating criteria for triggering report based on cell qualities at layer 3 (RRC, triggering RRC measurement report). Also any other combinations are possible such as performing first and second level filtering on L2 (triggering respective L2 measurement reports) or L3 (triggering respective L3 measurement reports). The first and second stage filtering may be performed on the same protocol layer (L3, RRC) or in different layers L2 and L3 so that first stage is on L2 and the second stage is L3. Also each layer may have its own respective report formats and reported object (beam, cell). Alternatively or additionally the first stage of higher layer filtering may be implemented also to be part of the L1 filtering.

The method can additionally include, at 350, a network element configuring the user equipment with beam-specific higher layer filter coefficients. This configuration can be received at the user equipment a 355. The beam specific higher layer filter coefficients can be used in the process of, for example, averaging different measurement samples from each of the beams.

The method can further include, at 360, a network element configuring the user equipment with beam-specific trigger information. This configuration can be received by the user equipment at 365. This first trigger (Tbeam) can trigger measurement report and UE actions to send measurement based on the serving cell individual beams quality.

The method can also include, at 370, a network element configuring the user equipment with cell-specific trigger information. This configuration can be received by the user equipment at 375. This second trigger value (Tcell) can trigger measurement report and UE actions to send measurement report based on serving cell and neighbor cell quality.

Thus, the method can include, at 380, providing a user equipment with a configuration for beam-specific measurements. This providing can include the various configurations at 350, 360, and 370, described above. The configuration can be the configuration applied at 305, described above. Moreover, the method can include receiving, at 390, cell level quality, and optionally also beam level quality, from the user equipment.

Figure 4:
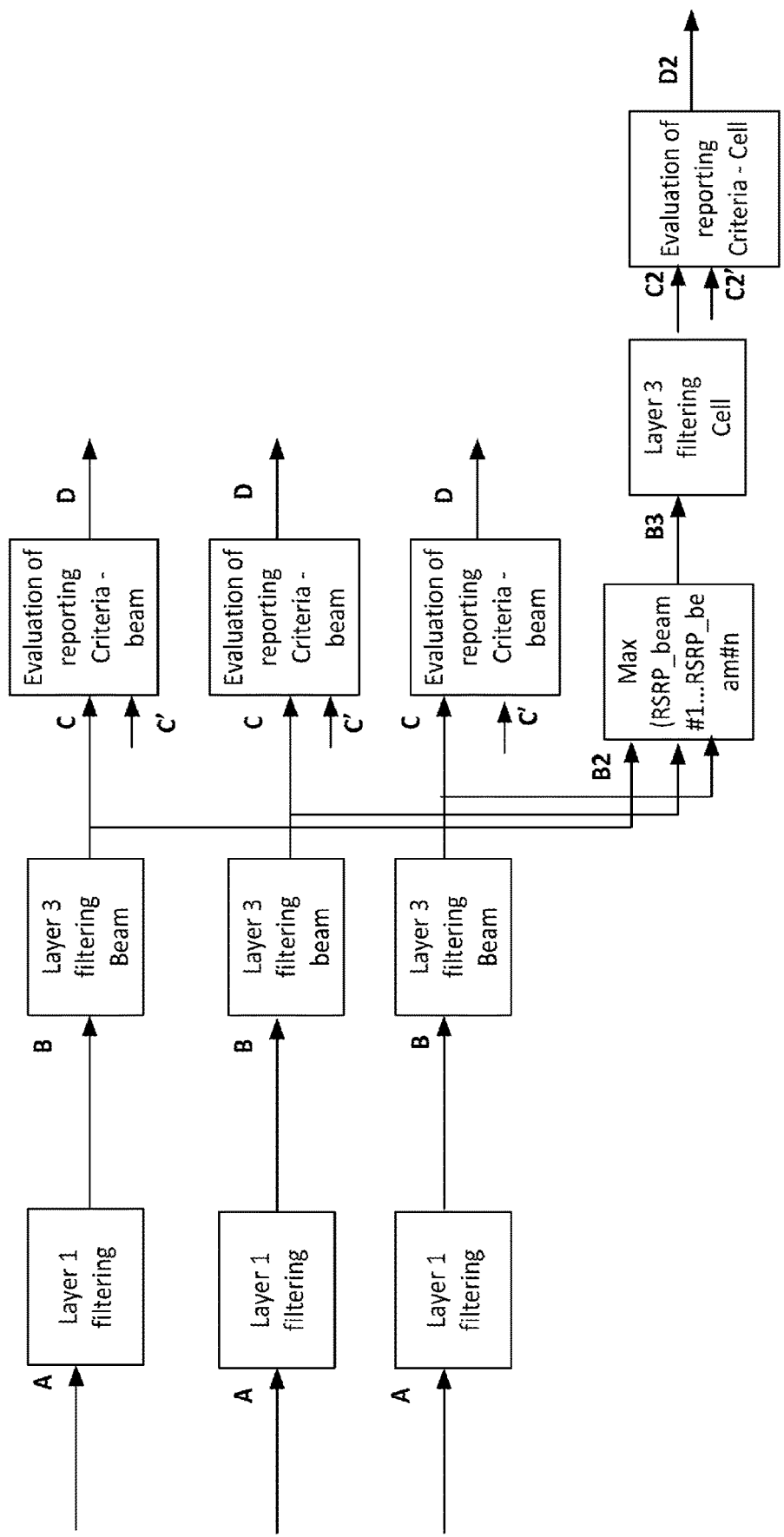
FIG. 4 illustrates measurement reporting, according to certain embodiments.

FIG. 4 illustrates measurement reporting, according to certain embodiments. Calculation of cell quality value may be determined by measuring first beam specific samples of at least one of the following RSRP, RSRQ, CQI or the like, point A in FIG. 4. In the figure one instance of point A represents a measured sample of a single beam. For the raw physical layer measurement samples UE may perform L1 filtering such as linear average of received power over measured reference signals (in OFDM over the reference symbols). Then UE filters beam specific measurement samples according to higher layer configured filters (RRC provides filter coefficients which can set also the filter to non-existing value), point B. The UE uses filtered beam quality values for evaluating beam specific measurement reports C and initiated beam specific measurement report in point D.

Additionally, after getting filtered beam quality values the UE can calculate cell level quality value as depicted in FIG. 4, for determining trigger for measurement report for cell reporting events.

Thus, FIG. 4 provides illustration of a measurement model with different filtering procedures for cell and beam reporting. At each period of getting filtered beam measurement samples, the UE can calculate the cell level quality value using the following equation in point B2 in FIG. 4:

Cell RSRP=max(RSRP Beam1, . . . ,RSRP BeamN).

Other techniques can also be used, such as providing an average of the best two beams of a given cell, as opposed to the single best beam. Alternatively or additionally cell specific weighting could be applied when determining the cell level quality, for example when multiple beams are detected with over a specific threshold quality. As an example, a cell with two beams with quality levels above 'Qlevel1' (set by network or is predefined) may be ranked higher than a cell with one beam with quality above 'Qlevel1'. The number of beams may also be used to dynamically derive the weighting parameters for the layer 3 (or layer 2) filter determining the cell quality value.

The UE may apply additional layer 3 filtering at point B3 in FIG. 4 to obtain cell level quality value. The configured Layer 3 filtering for beam and layer 3 filtering for cell can be different from one another.

For each measured cell, the UE can maintain a similar cell quality value, such as cell reference signal received power (RSRP), when evaluating a cell mobility-reporting criteria for the duration of Time-to-Trigger (TTTcell) and using the same filtered samples to evaluate serving cell beam reporting criteria for the duration of TTTbeam.

Figure 5:
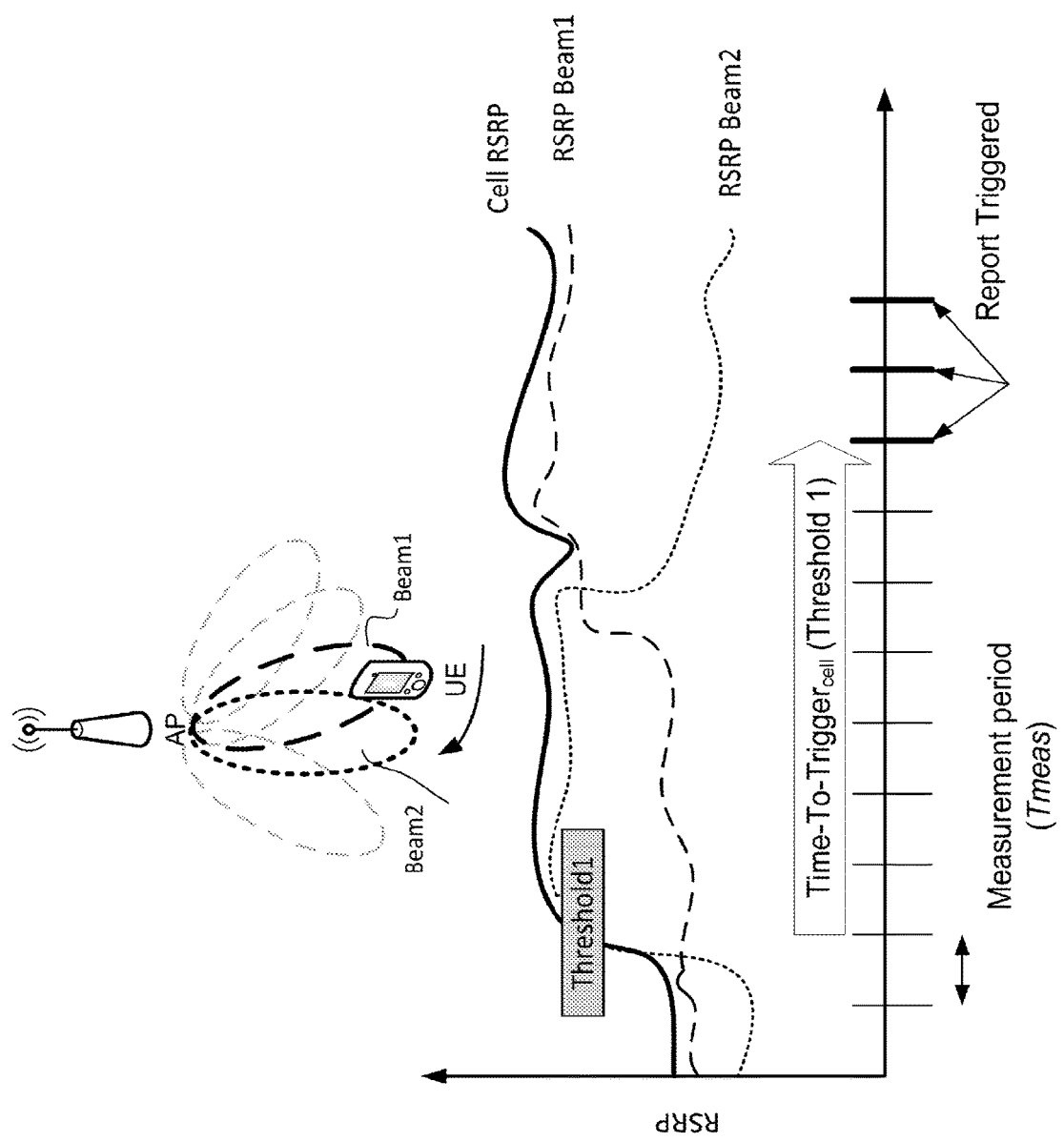
FIG. 5 illustrates cell quality calculation for time to trigger criteria, according to certain embodiments.

FIG. 5 illustrates cell RSRP calculation for time to trigger criteria, according to certain embodiments. As illustrated in FIG. 5, when the cell RSRP is above the predetermined threshold, a TTTcell timer can be started. The cell RSRP level can be compared to threshold1 on each measurement period (Tmeas) to determine if the measurement report criteria is fulfilled. The cell RSRP can reflect the maximum observed RSRP value during TTT and thus the criteria can be deemed fulfilled in the figure. This example may illustrate, for example, an event where a 'Serving Cell becomes better than threshold' or a 'neighbor cell becomes better than threshold.'

During the criteria evaluation, the UE compares only the 'Cell RSRP' but when it generates a measurement report, for example, in a case where 'Neighbor Cell2 becomes offset better than Serving Cell1' the measurement report can include the filtered beam index+filtered beam quality value of at least of Cell2. This report can be sent to serving cell1, which may utilize the report for evaluating the need for a cell changes to cell2 and further may provide such information to target cell2, or the report can be sent directly to cell2.

By using the same set of filtered beam measurement samples point C in FIG. 4, cell level beam reporting criteria can be evaluated. By now using different TTT values than for cell evaluation, the UE can react faster to the change of observed beam qualities and thus enable the network to maintain a so-called set of candidate beams. These beams can be used to communicate with the UE. The beam report may include a beam index and a quality value such as RSRP or RSRQ associated with the beam index. Other information may also be included in the beam report. Multiple beams may be reported, for example by reporting all the detected beams and quality values, or the N-best detected beams, or all detected beams having at least a threshold minimum quality.

Figure 6:
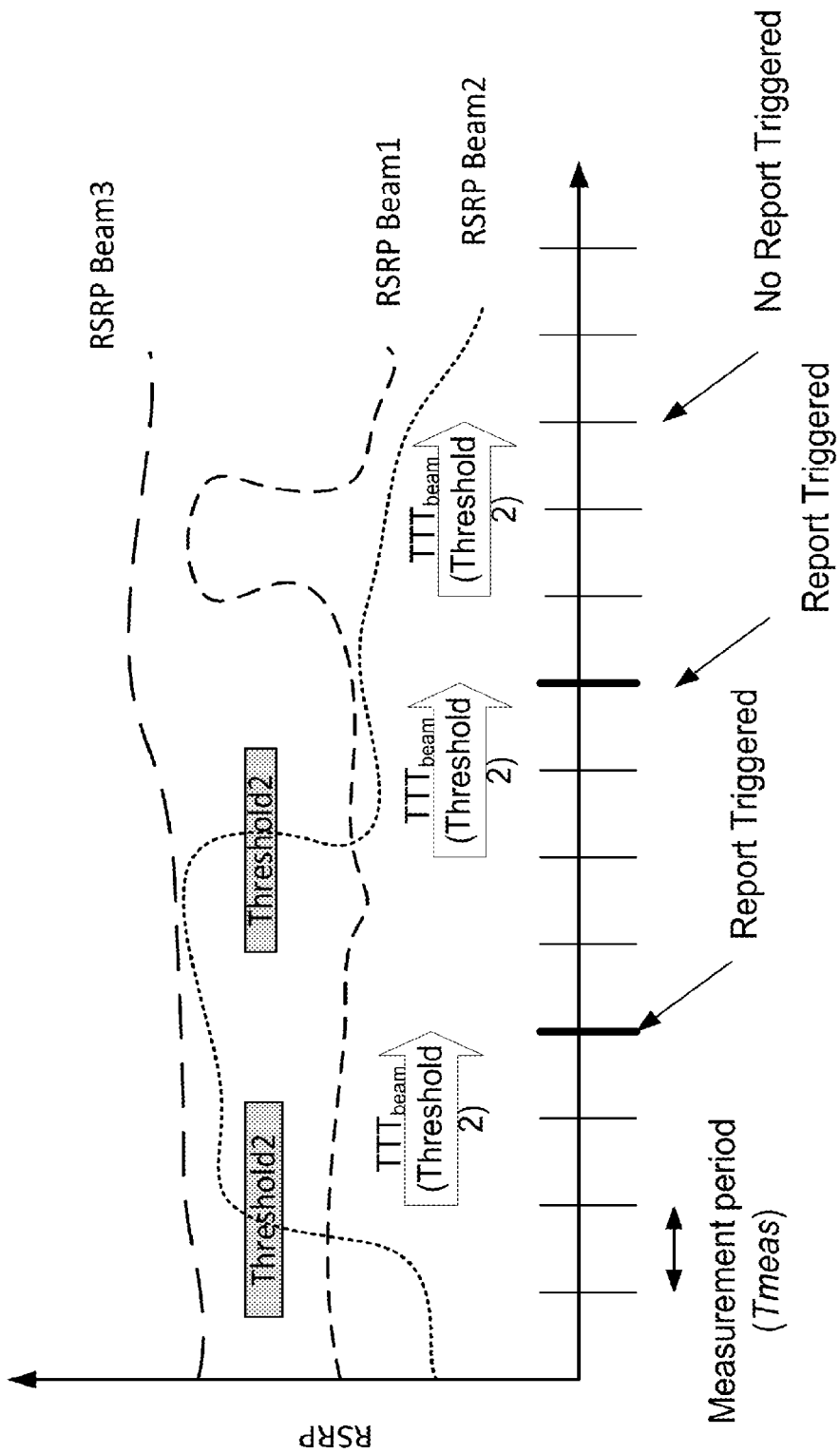
FIG. 6 illustrates beam specific time to trigger and report triggering based on a separate threshold, according to certain embodiments.

FIG. 6 illustrates TTTbeam and report triggering based on threshold2, according to certain embodiments. The following beam reporting events are illustrated in the FIG. 6. As shown in FIG. 6, beam2 can become better than a threshold2 which initiates TTTbeam. Additionally any offsets may be configured with the threshold2 so that TTTbeam is triggered when threshold2+offset criteria is met. Offset may be positive or a negative value. Threshold2 may be set by the network or may be derived based on the currently detected best filtered RSRP value of a beam.

Beam2 RSRP can be above threshold for duration of TTTbeam which then triggers measurement report. UE can report, for example, all beams above the threshold2 or N-best beams.

As shown in FIG. 6, beam2 becomes worse than threshold2 which initiates the TTTbeam. The beam2 RSRP stays below the threshold2 and thus a report is generated.

As shown in FIG. 6, beam1 detection initiates the TTTbeam but no report is triggered. As opposed to a case of reporting cell measurements, the TTTbeam may not trigger a periodic reporting but may be only a single measurement report.

Figure 7:
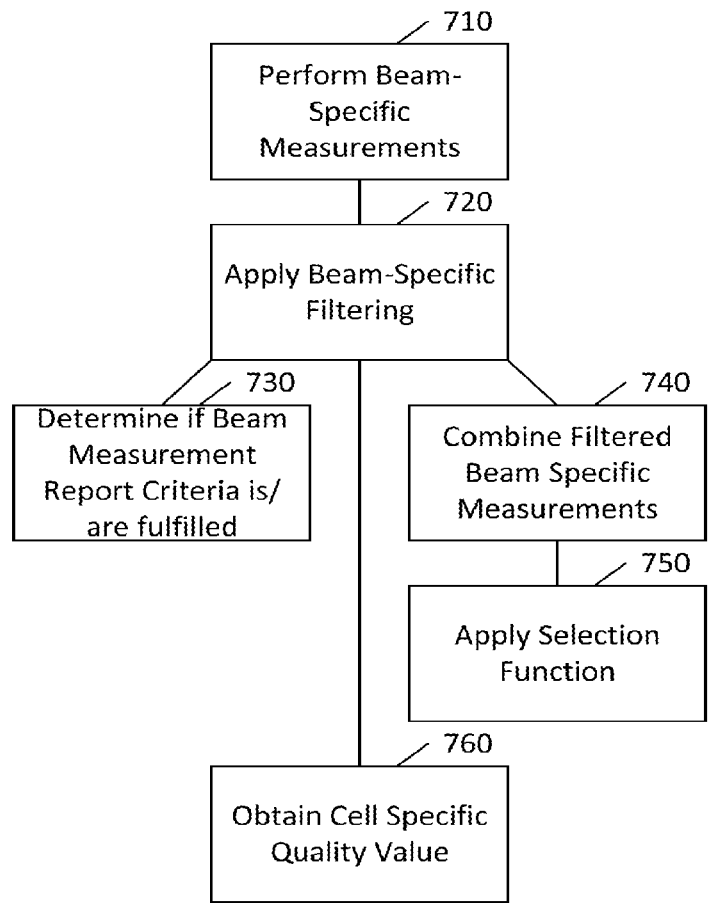
FIG. 7 illustrates a further method according to certain embodiments.

FIG. 7 illustrates a further method according to certain embodiments. The method of FIG. 7 can be viewed as an example of certain embodiments as discussed above, and as illustrated in FIG. 3 and FIG. 4.

As shown in FIG. 7, the method can include performing beam specific measurement results, at 710, and applying beam specific filtering (filter 1), at 720, on each beam. The beam specific filtered results can then be used, at 730, to determine if a beam measurement report criteria is fulfilled for serving cell filtered samples or other cell filtered samples. While the serving cell may be of interest in particular embodiments, other neighboring cells may similarly be of interest.

The method can additionally include combining the filtered beam specific measurements at 740 and applying a selection function at 750. The selection function may be, for example max RSRP or average of two or three best RSRP values. The filter coefficient can be modified such that if multiple high quality beams are detected, such a condition improves cell quality but only one value is derived out of filter 2.

Additionally, the method can include, at 760, obtaining a cell specific quality value by, for example, further filtering the beam specific filtered results using filter 2 for serving and adjacent cell or cells.

Such two-stage filtering may stabilize handover decisions, especially ones that involve RRC signaling. Other signaling may be UE context related signaling in a multi-cell environment where UE context/communication is transferred to another serving cell. A multi-cell environment may include, for example, a cluster of access-points under the same RRC or slave RRC. The first level of filtering can apply to serving cell beam management. Fast reacting filters can, for example, be applied as the network may need up-to-date beam information from the UE to perform scheduling decisions. If such measurements were used directly to determine handover there would be potentially excessive RRC signaling and frequent interruptions on service. Alternatively if a slowly reacting filter were used for serving cell beam level reporting, this would potentially cause link failure and excessive use of, for example, a random access procedure to recover from such failure. Such a slow filter may also impact NW scheduling decisions since the NW may not be able to optimize utilization of beam direction per transmission time interval.

Thus, certain embodiments may provide a system utilizing beamforming and beam specific reference signals. In such a system, firstly a two-stage filtering scheme may be applied. This filtering scheme may be accompanied by a corresponding two-stage report generation scheme, based on which stage(s) of the filtering triggers a report.

Moreover, certain embodiments may be applied not only to the case of inter-cell mobility, but also to the case of intra-cell mobility (intra-cell beam management). For example, the beam-specific measurements can be used to identify serving cell quality for the purposes of comparing to a neighboring cell, which may or may not employ beamforming itself. The beam-specific measurements can also be used to provide reports of better or comparable beams that the user equipment can detect. Thus, an access node or other network element configuring the user equipment may be able to make determinations regarding intra-cell mobility between, for example, various beams of a multi-beam cell.

In certain embodiments, the triggering of the two stages of filters may be somewhat independent and separate. For example, the two stages of filters can be used to trigger different reports on beam level/cell level so that a report type 1 may be triggered after a first stage but a report type 2 may not triggered after a second level of filtering, as these can be separate actions. These functions can run in parallel in the UE and can trigger two separate mobility actions, for example intra cell beam management and inter cell mobility, with different reports and trigger events. These functions and their reports can still be derived from the same measured samples. These two-stage filters can have an impact on, for example, service interruption time and signaling overhead.

Figure 8:
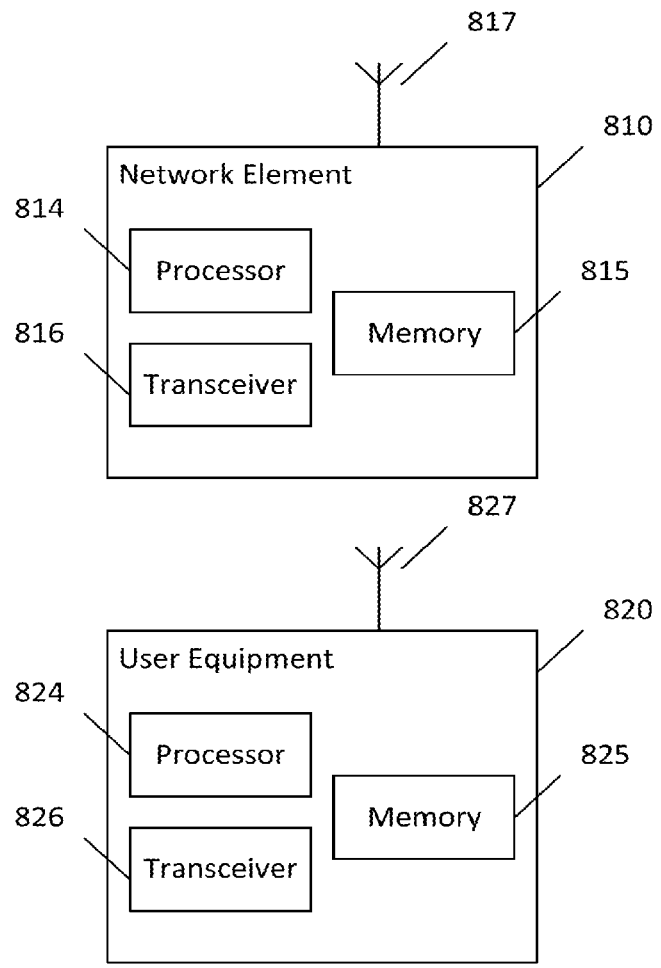
FIG. 8 illustrates a system according to certain embodiments.

FIG. 8 illustrates a system according to certain embodiments of the invention. It should be understood that each block of the flowchart of FIGS. 3 and 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), or any other network element, such as a PCell base station or an SCell base station. Network element may also refer to a another device in a device-to-device communication (D2D).

Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a vehicle, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIGS. 3 and 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 3, 4, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

TTT Time To Trigger
L1 Layer 1
L2 Layer 2
L3 Layer 3

According to a first embodiment, a method can include performing, at a user equipment, beam-specific measurements of a plurality of beams of at least one cell. The method can also include calculating a cell quality based on the beam-specific measurements.

In a variant, the method can also include determining a value to trigger a beam-specific measurement report.

In a variant, the method can also include evaluating triggering a report based on cell qualities.

In a variant, the method can further include evaluating triggering a report based on beam qualities.

In a variant, the evaluating triggering the report based on the beam qualities can be performed separately from the evaluating triggering the report based on cell qualities.

In a variant, method can include configuring the user equipment to perform the beam-specific measurements.

In a variant, the configuring the user equipment can include receiving beam-specific filter coefficients.

In a variant, the configuring the user equipment can include receiving beam-specific trigger information.

In a variant, the configuring the user equipment can include receiving cell-specific trigger information.

In a variant, the configuring the user equipment can include configuring the user equipment to perform beam specific layer one filtering and higher layer filtering of physical layer measurements of the beam specific samples, and to calculate a cell quality level based on the filtered beam specific samples.

In a variant, the configuring the user equipment can include configuring the user equipment to perform a first layer of higher layer filtering and evaluation of the beam-specific measurements at layer 2 and to perform a second layer of higher layer filtering and evaluation of the beam-specific measurements at layer 3.

In a variant, the evaluation at layer 2 can trigger layer 2 measurement reports and the evaluation at layer 3 can trigger layer 3 measurement reports.

According to a second embodiment, a method can provide a user equipment with configuration for beam-specific measurements. The method can also include receiving cell quality level information from the user equipment based on the configuration for beam-specific measurements.

In a variant, the method can include configuring the user equipment with beam-specific filter coefficients.

In a variant, the method can include configuring the user equipment with beam-specific trigger information.

In a variant, the method can include configuring the user equipment with cell-specific trigger information.

In a variant, method can also include receiving beam quality level information based on the configuration for beam-specific measurements.

The method according to the second embodiment, in any of its variants, can be combined and used in combination with the method according to the first embodiment, in any of its variants.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

We claim:

1. An apparatus, comprising:
at least one processor; and
at least one memory including computer program code;
the at least one memory and the computer program code are configured, with the at least one processor, to cause the apparatus at least to:
perform beam-specific measurements of a plurality of beams of at least one cell;
filter the beam-specific measurements;
apply a selection function based on the filtered beam-specific measurements;
determine a cell level quality based on at least one result of the applying of the selection function;
additionally filter, at a higher layer, based on the determination of the cell level quality; and
obtain a cell-specific quality value based on the additional filtering at the higher layer,
wherein the filtering of the beam-specific measurements is a layer 1 filtering or a physical layer filtering,
wherein the selection function comprises at least one of an average of more than one best reference signal received power based on the filtered beam-specific measurements or cell specific weighting, and
wherein the at least one cell, with a number of beams with quality levels above a predefined threshold quality, is ranked higher than another cell with a lower number of beams with quality levels above a predefined threshold quality.

2. The apparatus according to claim 1, wherein the at least one memory and the computer program code are configured, with the at least one processor, to cause the apparatus at least to take an average of the beam-specific measurements.

3. The apparatus according to claim 1, wherein the cell specific weighting comprises using a number of beams to derive weighting parameters.

4. The apparatus according to claim 1, wherein the higher layer comprises layer 3 or radio resource control layer.

5. The apparatus according to claim 1, wherein configuration of the additional filtering at the higher layer is provided by radio resource control signaling.

6. The apparatus according to claim 5, wherein the radio resource control signaling provides filtering coefficients.

7. The apparatus according to claim 1, wherein the at least one memory and the computer program code are further configured, with the at least one processor, to cause the apparatus at least to:
perform a first stage higher layer filtering to the filtered beam-specific measurements; and
perform a second stage higher layer filtering to a result of the first stage higher layer filtering and a result of the applying a selection function.

8. The apparatus according to claim 7, wherein the first stage higher layer filtering and the second stage higher layer filtering are performed on a same protocol layer or on different protocol layers.

9. The apparatus according to claim 7, wherein the first stage higher layer filtering comprises at least one of a layer 1 filtering, a layer 2 filtering or a layer 3 filtering, and the second stage higher layer filtering comprises a layer 2 filtering or a layer 3 filtering.

10. A method, comprising:
performing, at a user equipment, beam-specific measurements of a plurality of beams of at least one cell;
filtering the beam-specific measurements;
applying a selection function based on the filtered beam-specific measurements;
determining a cell level quality based on at least one result of the applying of the selection function,
additionally filtering, at a higher layer, based on the determination of the cell level quality; and
obtaining a cell-specific quality value based on the additional filtering at the higher layer,
wherein the filtering of the beam-specific measurements is a layer 1 filtering or a physical layer filtering,
wherein the selection function comprises at least one of an average of more than one best reference signal received power based on the filtered beam-specific measurements or cell specific weighting, and
wherein the at least one cell, with a number of beams with quality levels above a predefined threshold quality, is ranked higher than another cell with a lower number of beams with quality levels above a predefined threshold quality.

11. The method according to claim 10, further comprising:
performing a first stage higher layer filtering to the filtered beam-specific measurements; and
performing a second stage higher layer filtering to a result of the first stage higher layer filtering and a result of the applying a selection function.

12. The method according to claim 11, wherein the first stage higher layer filtering and the second stage higher layer filtering are performed on the same protocol layer or on different protocol layers.

13. A non-transitory computer-readable medium encodes instructions that, when executed in hardware, perform a process including the method according to claim 10.

14. The method according to claim 10, wherein the higher layer comprises layer 3 or radio resource control layer.

15. The method according to claim 10, further comprising:
taking an average of the beam-specific measurements.

16. The method according to claim 10, wherein the cell specific weighting comprises using a number of beams to derive weighting parameters.

17. The method according to claim 10, wherein configuration of the additional filtering at the higher layer is provided by radio resource control signaling.

18. The method according to claim 10, wherein the radio resource control signaling provides filtering coefficients.

19. The method according to claim 10, wherein a first stage higher layer filtering comprises at least one of a layer 1 filtering, a layer 2 filtering or a layer 3 filtering, and a second stage higher layer filtering comprises a layer 2 filtering or a layer 3 filtering.

* * * * *